United States Patent Office 3,188,418
Patented June 8, 1965

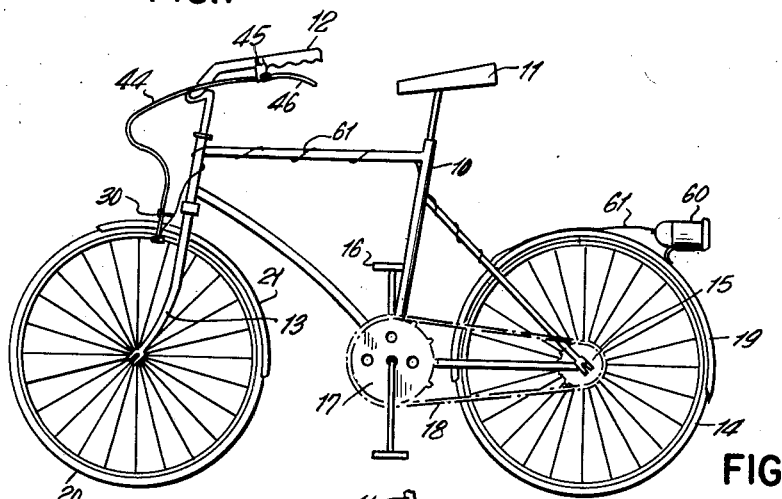
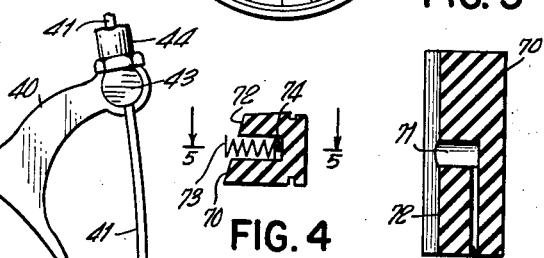
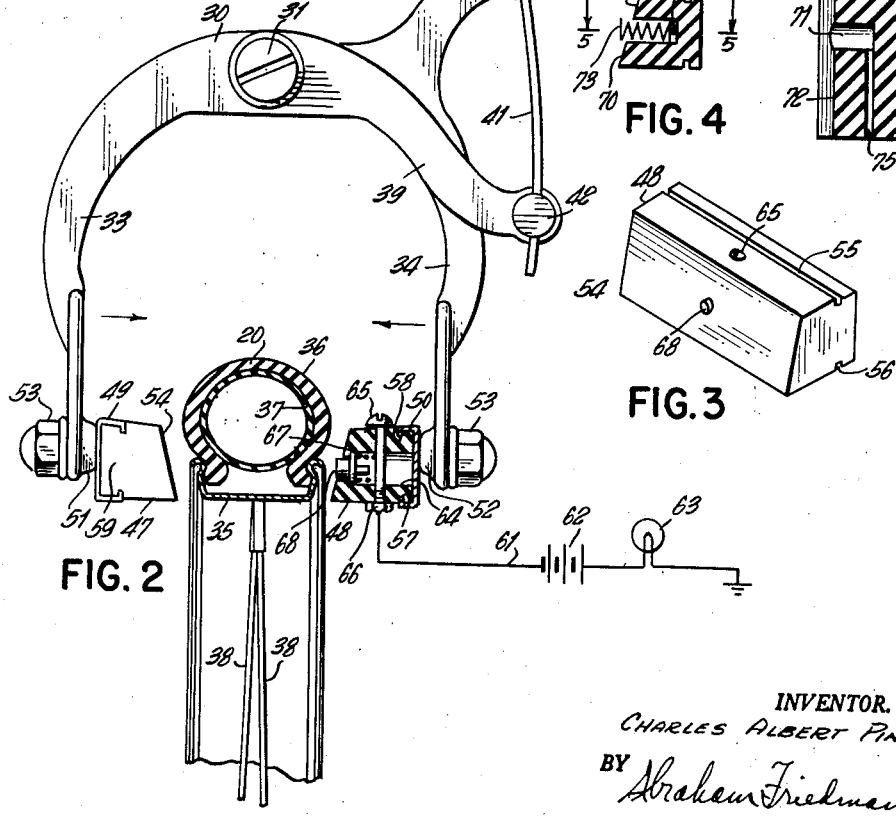

3,188,418
BICYCLE BRAKE SWITCH
Charles Albert Pino, 8732 Bay 16th St., Brooklyn, N.Y.
Filed Mar. 8, 1961, Ser. No. 94,186
4 Claims. (Cl. 200—61.12)

This invention relates in general to brake lights for bicycles and the like. More particularly, this invention relates to brake lights with brake light switch means which light a brake light upon the application of bicycle type wheel brakes.

An object of this invention is to provide a more foolproof brake light system for bicycles which is more certain to be activated to give an appropriate warning to following traffic when the brakes are applied.

Another object of this invention is to provide a positive acting brake light switch means for use on bicycles and other vehicles having wheel rim contacting braking pads.

A further object of this invention is to provide a brake light switch means which may be easily installed on a bicycle along with an extra front wheel brake.

Yet another object of this invention is to provide a stop light switch means for bicycles which may be installed without removing an existing wheel brake.

Still another object of this invention is to provide a less expensive bicycle stop light switch which is easily manufactured and which may be readily adapted for use with conventionl equipment.

A still further object of this invention is, for bicycles and the like, to provide a switch for a brake light which is less likely to malfunction because non-conductive corrosion or other foreign matter is deposited between the contacting elements of the switch.

Many other objects, advantages and features of invention reside in the construction, arrangement and combination of parts involved in the embodiment of the invention and its practice as will be understood from the following descriptions and accompanying drawing wherein:

FIGURE 1 is a side view of a bicycle with a stop light and stop light switch means mounted thereon according to my invention;

FIGURE 2 is a front view of a conventional wheel brake mounted about a fragment of a bicycle wheel shown in section with one brake pad modified according to a first embodiment of this invention and shown in section;

FIGURE 3 is a perspective view of a brake pad modified according to the first embodiment of this invention;

FIGURE 4 is a transverse section through a brake pad modified according to the second embodiment of this invention; and FIGURE 5 is a section taken on line 5—5 of FIGURE 4 with the contact and the current conducting member removed.

Referring to the drawing in detail, FIGURE 1 shows a conventional bicycle having a frame 10, a seat 11 and handle bars 12 which turn the front fork 13 to steer the bicycle. A rear wheel 14 is rotatably secured to frame 10 and carries the rear sprocket 15. The bicycle is moved by means of the pedals 16 which turn the front sprocket 17 to drive the rear wheel 14 by means of the rear sprocket 15 and chain 18. A fender 19 covers rear wheel 14 and is secured to frame 10. A front wheel 20 is rotatably mounted within the front fork 13 to which the front fender 21 is also secured.

Referring now to FIGURES 1 and 2, a hand activated wheel brake 30 is attached to front fork 13 by means of a stud or bolt 31. The two brake arms 33 and 34 are secured to rotate about stud 31 and they extend downward on either side of the rim 35 of front wheel 20. A tire 36 and an inner tube 37 are mounted on rim 35 which is supported by the spokes 38.

Brake arm 33 has an extension 39 which extends beyond and below bolt 31. Brake arm 34 has an upper extension 40 which terminates above the end of extension 39. A control cable 41 is fixed to the end of extension 39 by means of a wire clamp stud 42. The control cable 41 extends slidably through the stud 43 which is mounted on the end of extension 40. A control cable sheath 44 is disposed about the control cable 41 and is fixed to stud 43. A conventional hand brake mechanism 45 is secured to the handlebar 12 and activated by means of the lever 46.

The hand brake 30 operates in the following manner. When lever 46 is pulled upwards, it withdraws the control cable 41 within its sheath 44 to urge the ends of the extensions 39 and 40 together. This causes the brake arms 33 and 34 to pivot about the stud 31 and bring the brake pads 47 and 48 into contact with rim 35. As the brake pads 47 and 48 clamp rim 35 between them, they tend to stop the rotation of wheel 20.

As shown in FIGURE 2, two brake pad holders 49 and 50 are fixed within the lower ends of the brake arms 33 and 34 by means of the studs 51 and 52 which are welded or otherwise secured to the brake pad holders. The studs 51 and 52 pass through apertures in the brake arms 33 and 34 and are locked in position by means of the nuts 53.

As shown in FIGURES 2 and 3, brake pads 48 are made of rubber or other suitable abrasion-resistant material. These brake pads have their front faces 54 formed at an appropriate angle to make contact with the sides of rim 35. The upper and lower rear edges of each brake pad may contain longitudinal grooves 55 and 56. The brake pads 47 and 48 are inserted into the brake pad holders 49 and 50 by sliding them from one end so that the upper and lower inwardly turned edges 57 and 58 of each brake pad holder 49 and 50 engage the grooves 55 and 56. Each brake pad holder has one end wall 59 to prevent the brake pads 47 and 48 from being forced forward out of the brake pad holders when the brake pads contact rim 35 as the hand brake is applied.

Referring again to FIGURE 1, a tail light 60 is mounted on rear fender 19 or some other suitable location on the bicycle. A single electrically insulated conducting wire 61 extends from tail light 60 forward to brake pad 48. Referring now to FIGURE 2, tail light 60 may contain a suitable source of electric current such as the dry cell battery 62 and it also contains a bulb 63. Bulb 63 is connected to battery 62 and it is grounded to the frame 10 of the bicycle through the casing of light 60 or fender 19.

In a first embodiment of this invention, a large aperture 64 extends from the back of brake pad 48 through its front surface 54. A bolt 65 extends vertically through an intersecting aperture in brake pad 48. The wire 61 is connected to bolt 65 by means of nut 66. A small compression coil spring 67 bears against the shank of bolt 65 and against the detent or contact 68. In assembly, the contact 68 is inserted from the rear into aperture 64 followed by the coil spring 67 which is then secured in position within aperture 64 by means of bolt 65. Aperture 64 is reduced in size before it emerges from the front face 54 of brake pad 48 so that contact 68 may extend through the reduced portion of aperture 64 to project beyond the front face 54 while being retained within aperture 64 by a rearwardly disposed flange which is larger than the reduced portion of aperture 64.

As the brakes are applied, the brake pads 47 and 48 move inward to contact rim 35 of wheel 20. As the brake pads move inward, contact 68 touches rim 35. Current flows from battery 62 through wire 61, bolt 65, spring 67 and contact 68 into rim 35. Current then passes through the spokes 38, the bearings of wheel 20, the front fork 13, and through the frame of the bicycle back to bulb 63 which then lights. Therefore, as long as the brakes are applied, contact 68 will touch rim 35 to light bulb 63 and thus warn following traffic. Whenever the brakes are applied, the brake pads 47 and 48 rub against the sides of the rapidly turning rim 35. This moving contact removes all foreign matter and insures that a good electrical connection is always made between contact 68 and rim 35. Even should rim 35 or contact 68 become corroded, the relative motion between these elements removes the foreign matter to insure the operation of the brake light 60. As the front face 54 of brake pad 48 wears down, contact 60 will merely project a greater distance and then be forced back a greater distance against the compression spring 67 when the brakes are applied. If it is desired, aperture 64 may be extended completely through brake pad 48 without reducing its diameter near the front face 54. In this case, the contact 68 should be soldered or otherwise fixed to the spring 67 which, in turn, is then fixed to bolt 65. Spring 67 would then merely hold contact 68 to extend beyond the front face 54 of brake pad 48. If the brake pad 48 is formed of a resilient as well as an insulating material, the contact 68 may be merely imbedded in the front surface 54 of brake pad 48. When the brakes are then applied, the resilient material of brake pad 48 will merely deform as contact 68 rides against and touches the side of rim 35.

Referring now to FIGURES 4 and 5, a brake pad 70 may have an aperture 71 formed in its rim contacting surface 72. A single contact 73, which consists of a compression coil spring, is disposed within aperture 71. A conducting member 74 is thrust longitudinally through brake pad 70 through aperture 75 to contact spring 73. If it is desired, the conducting member 74 may be soldered to spring 73 to hold it in position.

While I have shown and described my invention applied to the front wheel hand brake of a bicycle, it could as easily be operated by a rear wheel hand brake or it could be applied to motorcycles having exterior rim contacting brake pads. The current source 62 could be a generator or other current source which was external from the tail light 60, while the bulb 63 could merely be the brake light portion of an otherwise constantly activated tail light.

If it is desired, an entire unit comprising a front hand brake and a brake light may be sold as a single brake unit. A pad modified according to this invention may be sold to be slipped into an existing wheel brake to be connected to and activate a brake light. Since some brake pads 48 are glued, crimped or otherwise mounted in brake pad holders 50, a brake pad according to this invention may be sold already mounted in a brake pad holder 50 to be attached by means of a bolt 52 and a nut 53.

While I have disclosed my invention in the best forms known to me, it is to be understood that these are pure exemplary and that modifications in the construction, arrangement and combination of parts may be made without departing from the spirit of the invention except as it may be more limited in the appended claims wherein I claim:

1. A bicycle brake switch comprising a brake pad formed of electrical insulation material, a wheel rim contacting braking surface provided on said pad, a recess defined within said pad and extending to said surface, an electrically conductive bolt provided on said pad and extending across said recess, an electrical contact provided in said recess and projecting from said surface, and an electrically conductive spring provided within said recess, said spring extending between said bolt and said contact and biasing said contact outwardly from said surface.

2. A bicycle brake switch comprising a brake pad formed of electrical insulation material, a wheel rim contacting braking surface provided on said pad, a recess defined within said pad and extending to said surface, an electrically conductive bolt provided on said pad and extending across said recess, an electrical contact provided in said recess and projecting from said surface, and an electrically conductive spring provided within said recess, said spring extending between said bolt and said contact and biasing said contact outwardly from said surface, and means to retain said contact within said pad against the bias of said spring.

3. A bicycle brake switch comprising a brake pad formed of electrical insulation material, a wheel rim contacting braking surface provided on said pad, a recess defined within said pad and extending to said surface, an electrically conductive bolt provided on said pad and extending across said recess, an electrical contact provided in said recess and projecting from said surface, and an electrically conductive spring provided within said recess, said spring extending between said bolt and said contact and biasing said contact outwardly from said surface, and means provided on said bolt for connecting an electric conductor thereto.

4. A bicycle brake switch comprising a brake pad formed of electrical insulation material, a wheel rim contacting braking surface provided on said pad, a recess defined within said pad and extending to said surface, and electrical contact means provided within said recess and projecting from said surface, said contact means comprising an electrically conductive spring provided within said recess, one end of said spring projecting from said surface, and an electrically conductive bolt mounted within said pad, the other end of said spring being secured to said bolt.

References Cited by the Examiner

UNITED STATES PATENTS

| 735,113 | 10/03 | Kelland et al. | 188—24 |
| 2,699,228 | 1/55 | Menneson | 188—24 |
| 2,814,684 | 11/57 | DePascale | 200—61.4 |

FOREIGN PATENTS

| 504,450 | 4/39 | Great Britain. |
| 969,900 | 5/50 | France. |

BERNARD A. GILHEANY, *Primary Examiner.*

R. V. ROLINEC, NEIL C. READ, *Examiners.*